United States Patent [19]

Hansen

[11] Patent Number: 5,262,065
[45] Date of Patent: Nov. 16, 1993

[54] APPARATUS AND METHOD FOR DECONTAMINATING AQUIFERS

[75] Inventor: Kevin Hansen, Newark, Del.

[73] Assignee: Roy. F. Weston, Inc., West Chester, Pa.

[21] Appl. No.: 718,195

[22] Filed: Jun. 20, 1991

[51] Int. Cl.⁵ .................. E21B 43/00; F04B 47/06
[52] U.S. Cl. ..................... 210/747; 166/105; 166/227; 166/265; 210/117; 210/170; 210/316; 210/416.1; 210/460; 210/767; 210/806; 417/423.3; 417/423.9; 417/423.14
[58] Field of Search ............ 210/747, 767, 806, 117, 210/170, 326, 416.1, 460, 463, 417, 776, 744, 242.2; 166/105, 105.5, 107, 227, 228, 265; 417/423.3, 423.5, 423.9, 423.14

[56] References Cited

U.S. PATENT DOCUMENTS

| | | | |
|---|---|---|---|
| 2,648,286 | 8/1953 | Bergh | 417/423.3 |
| 3,086,472 | 4/1963 | Lorenzetti | 417/61 |
| 3,273,507 | 9/1966 | Handford | 417/61 |
| 3,437,946 | 4/1969 | Tremain et al. | 417/423.3 |
| 3,507,602 | 4/1970 | Watson | 415/72 |
| 3,521,970 | 7/1990 | Deters | 417/423.3 |
| 3,672,795 | 6/1972 | Arutunoff et al. | 417/424.1 |
| 3,722,687 | 3/1973 | Stebbins | 210/219 |
| 3,782,553 | 1/1974 | Brekke | 210/242.3 |
| 3,808,823 | 5/1974 | Chelminski et al. | 166/265 |
| 4,038,182 | 7/1977 | Jenkins | 210/242.2 |
| 4,167,973 | 9/1979 | Forte et al. | 210/170 |
| 4,405,458 | 9/1983 | McHugh, Jr. | 210/242.3 |
| 4,469,170 | 9/1984 | Farmer, Jr. | 166/107 |
| 4,580,634 | 4/1986 | Cruise | 166/310 |
| 4,625,807 | 12/1986 | Harlow | 166/370 |
| 4,663,037 | 5/1987 | Breslin | 210/170 |
| 4,746,423 | 5/1988 | Moyer | 210/104 |
| 4,844,797 | 7/1984 | Wells | 166/105 |
| 4,908,127 | 5/1990 | Metais | 210/123 |
| 4,998,585 | 3/1991 | Newcomer et al. | 166/105 |
| 5,013,218 | 5/1991 | Spencer | 166/265 |
| 5,070,940 | 12/1991 | Conner et al. | 166/105 |
| 5,115,864 | 5/1992 | Gaidry et al. | 166/228 |

*Primary Examiner*—Robert A. Dawson
*Assistant Examiner*—Sun Uk Kim
*Attorney, Agent, or Firm*—Miller & Christenbury

[57] ABSTRACT

The invention provides a novel apparatus and method for removing liquid contaminant from a well to decontaminate a contaminated aquifer. The apparatus includes a pump capable of moving water and contaminant from below ground surface to a location above ground surface, a motor connected to drive the pump and means connected to power the motor. A water and contaminant inlet are located between the pump and the motor to accept inward flow of water and contaminant to the pump. An outlet pipe connects to the pump and extends above ground surface. A sleeve surrounds the inlet and connects between the inlet and the motor and has an opening to receive water and contaminant. The sleeve is sized to slide in and out of the well and is larger than the outlet pipe. The sleeve creates an annular space around the outlet pipe to permit passage of water and contaminant from the open end to the inlet.

20 Claims, 3 Drawing Sheets

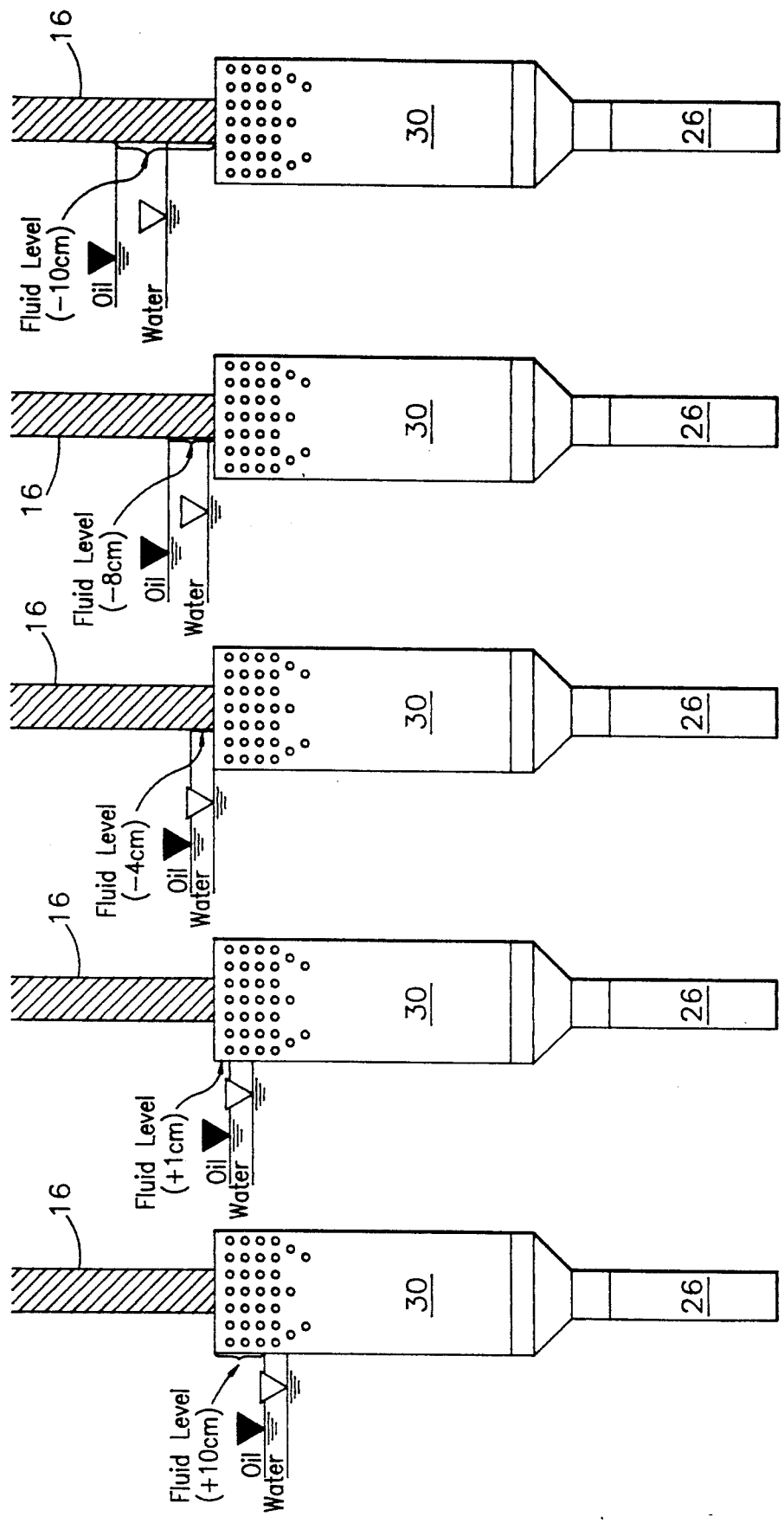

APPARATUS AND METHOD FOR DECONTAMINATING AQUIFERS

FIELD OF THE INVENTION

The present invention relates to a method and apparatus for decontaminating aquifers, particularly to a method and apparatus for removing liquid contaminants from wells extending into contaminated aquifers.

BACKGROUND OF THE INVENTION

Increasing environmental awareness of contaminated commercial, private and government properties and their potential danger to on-site personnel and surrounding communities has resulted in development of various technologies to attempt to remove and safely dispose of toxic chemical contaminants present in the ground. Some of these technologies have proven to be somewhat applicable in limited situations.

One particular problem of interest relates to contamination of soils and ground water by liquid organic compounds which have been released into the ground over a period of time or were accidentally spilled in one or more isolated incidents. In either case, there is frequently a severe danger that the organic compounds will migrate into a water supply. This can result in direct contamination of ground water and adjacent fresh water wells or lateral migration into remote wells, surface water or wherein adjacent inhabited surface areas are directly exposed to toxic liquids. The presence and possible movement of these liquids in the ground may also present hazards to occupants of nearby buildings or future buildings to be constructed, or to construction and excavation workers.

Because of the acute toxic dangers presented by these contaminants, it is frequently imperative that the contaminants be promptly, efficiently and effectively removed. However, many constraints often inhibit or prevent removal. For example, if the contaminant has progressed downwardly to a point where excavation of the soils is impossible, the soil and ground water must be decontaminated in situ. This restriction eliminates many existing decontamination technologies.

DESCRIPTION OF THE PRIOR ART

Several techniques have been developed to decontaminate soils and ground water under these and other conditions. However, they are typically limited in their flexibility of use and effectiveness.

For example, U.S. Pat. No. 4,746,423 discloses an in-well pump skimmer. '423 discloses drawing down the water table into a "cone" or "funnel" shape to assist in recovering contaminants lying on top of the water table. It includes a two-pump system in which the output of total fluids is unregulated by the naturally-occurring depth of the cone of depression. The water pump continues to pump at the same rate regardless of the outside depth of the water.

This system is unable to compensate for the natural tendency of aquifers to vary simultaneously in water level and in floating contaminant level. There is no natural compensation within the system adjusting the flow rate for variations in the water level. Also, the presence of a variety of pumps, sensors and valve apparatus results in a system susceptible to fouling and breakdown, which is difficult to repair and adjust in the field.

U.S. Pat. No. 4,625,807 discloses a method and apparatus for recovering water immiscible liquids from water-bearing formations. '807 discloses a system typical of many of the two-pump contaminant recovery systems and exhibits their deficiencies. The apparatus consists of a lower water-only pump with a shallower fixed-depth pump which removes a lighter liquid. An upper pump is driven by air pressure. However, '807 fails to provide means for a simple way to compensate for the fluctuating level of contaminant in the well bore which occurs under natural conditions. There is a built-in limited flexibility in the upper contaminant pump intake. The system also requires frequent maintenance because of the intricate float mechanisms involved.

U.S. Pat. No. 4,663,037 discloses an apparatus for recovering liquid hydrocarbons from ground water. This system is a variant of floating skimmer recovery systems. It recovers single floating phase contaminant and is limited in vertical travel to a set distance between plugs in a well. It will not recover both the floating and sinking phases of contaminants in a well.

U.S. Pat. Nos. 3,273,507; 3,722,687; 4,038,182; 4,405,458; and 4,908,127 disclose floating skimmer devices adapted for open surface water use. These devices are, however, limited to open surface water contaminant recovery conditions and are not suitable for contaminant recovery from wells.

OBJECTS OF THE INVENTION

It is an object of the present invention to provide an apparatus for removing contaminant from aquifers, capable of use at great depths, from boreholes and/or wells extending into the contaminated aquifer.

It is another object of the present invention to provide an apparatus for decontaminating aquifers which is inexpensive to construct and maintenance-free during contaminant recovery operations.

It is an important object of the invention to provide an apparatus which is easily installed and requires little or no monitoring during the contaminant recovery process.

It is a further object of the present invention to provide a method of recovering contaminant from an aquifer which effectively removes contaminant from aquifers to at least an environmentally acceptable level and at low cost.

Other objects and advantages of the present invention will become apparent to those skilled in the art from the drawings, the detailed description of preferred embodiments and the appended claims.

SUMMARY OF THE INVENTION

The invention provides a novel apparatus for removing liquid contaminant from a well to decontaminate a contaminated aquifer. The apparatus includes a pump capable of moving water and contaminant from below ground surface to a location above ground surface, a motor connected to drive the pump and means connected to power the motor. A water and contaminant inlet are located between the pump and the motor to accept inward flow of water and contaminant to the pump. An outlet pipe connects to the pump and extends above ground surface. A sleeve surrounds the inlet and connects between the inlet and the motor and has an opening to receive water and contaminant. The sleeve is sized to slide in and out of the well and is larger than the outlet pipe. The sleeve creates an annular space around the outlet pipe to permit passage of water and contaminant from the open end to the inlet.

The invention also provides a novel process for removing liquid contaminant lying on a water table. The process includes drilling at least one well into the water table and then lowering a water and contaminant pump system into the well. The pump system includes a pump capable of moving water and contaminant from below ground surface to a location above ground surface, having a pump inlet connected to accept inward flow of water and contaminant to the pump and a motor connected to drive the pump. The pump system also includes electrical connection to supply power to the motor, an outlet pipe connected to the pump and extending above ground and a sleeve surrounding the pump inlet. The sleeve has an opening to receive water and contaminant at one or more points along the outlet pipe. The sleeve is larger than the outlet pipe and creates an annular space to permit passage or water and contaminant to the inlet.

The pump system is lowered to a desired depth within the well wherein the opening in the sleeve is located below the top of water in the well. The pump is then actuated to cause water to flow into the sleeve and through the inlet, the pump and the pipe to a location above ground surface.

Then, the water table is drawn down until an opening in the sleeve is at about the top of the contaminant floating on the water in the well and the depth to the contaminant stabilizes at a substantially constant depth. Water and contaminant are pumped and removed from the well until the contaminant is substantially removed from the top of the water table.

BRIEF DESCRIPTION OF THE DRAWINGS

FIGS. 4-8 show schematic front elevational views of pumps in accordance with the invention variably positioned with respect to the water table and a layer of contaminant floating on the water table.

DETAILED DESCRIPTION OF THE INVENTION

It will be appreciated that the following description is intended to refer to the specific embodiments of the invention selected for illustration and the drawings and is not intended to define or to limit the invention, other than in the appended claims.

Figure 1:
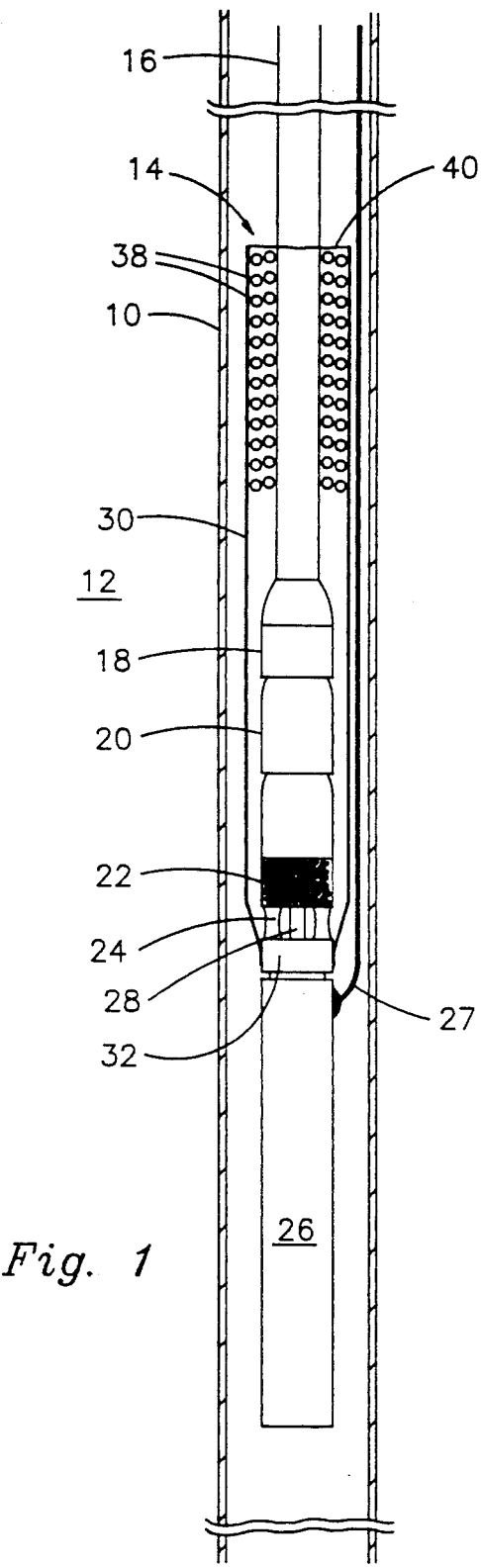
FIG. 1 shows a front elevational view, taken partially in cross section, of a pump in accordance with the invention positioned within a well casing.
Figure 2:
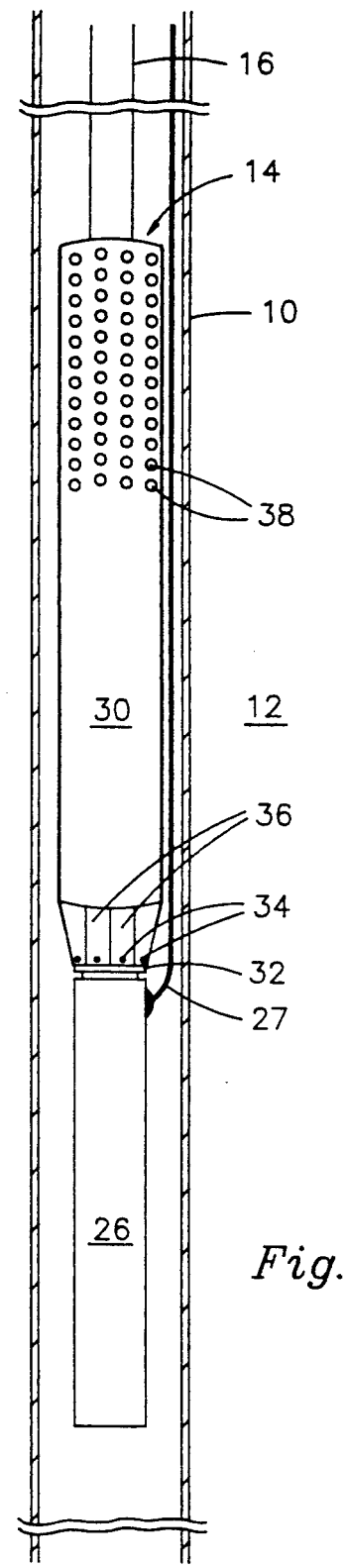
FIG. 2 shows a front elevational view of the pump from FIG. 1 in accordance with the invention positioned within a well casing.

Turning now to the drawings in general and FIGS. 1 and 2 in particular, the number 10 designates a well casing extending into a subsurface area 12. A pump system 14 is positioned within well casing 10 at a desired depth.

Pump system 14 includes outlet pipe 16 which connects to check valve 18. Check valve 18 is located adjacent to and connects to pump 20. Pump 20 connects to strainer 22, which in turn connects to a pump inlet 24. Motor 26 connects to base flange 32 which connects to pump inlet 24. Motor 26 has a drive shaft 28 extending through base flange 32 and drives pump 20. Motor 26 receives power from power supply line 27, which connects to a power source (not shown).

Sleeve 30 connects to pump system 14 at base flange 32 by threaded bolts 34. Each threaded bolt connects a reduced-diameter section 36, which consists of reduced-diameter portions of sleeve 30, to base flange 32. Sleeve 30 has a multiplicity of perforations 38 in its upper portion. There are no perforations in the reduced-diameter section 36. Vibration brace 40 extends between outlet pipe 16 and sleeve 30.

Figure 3:
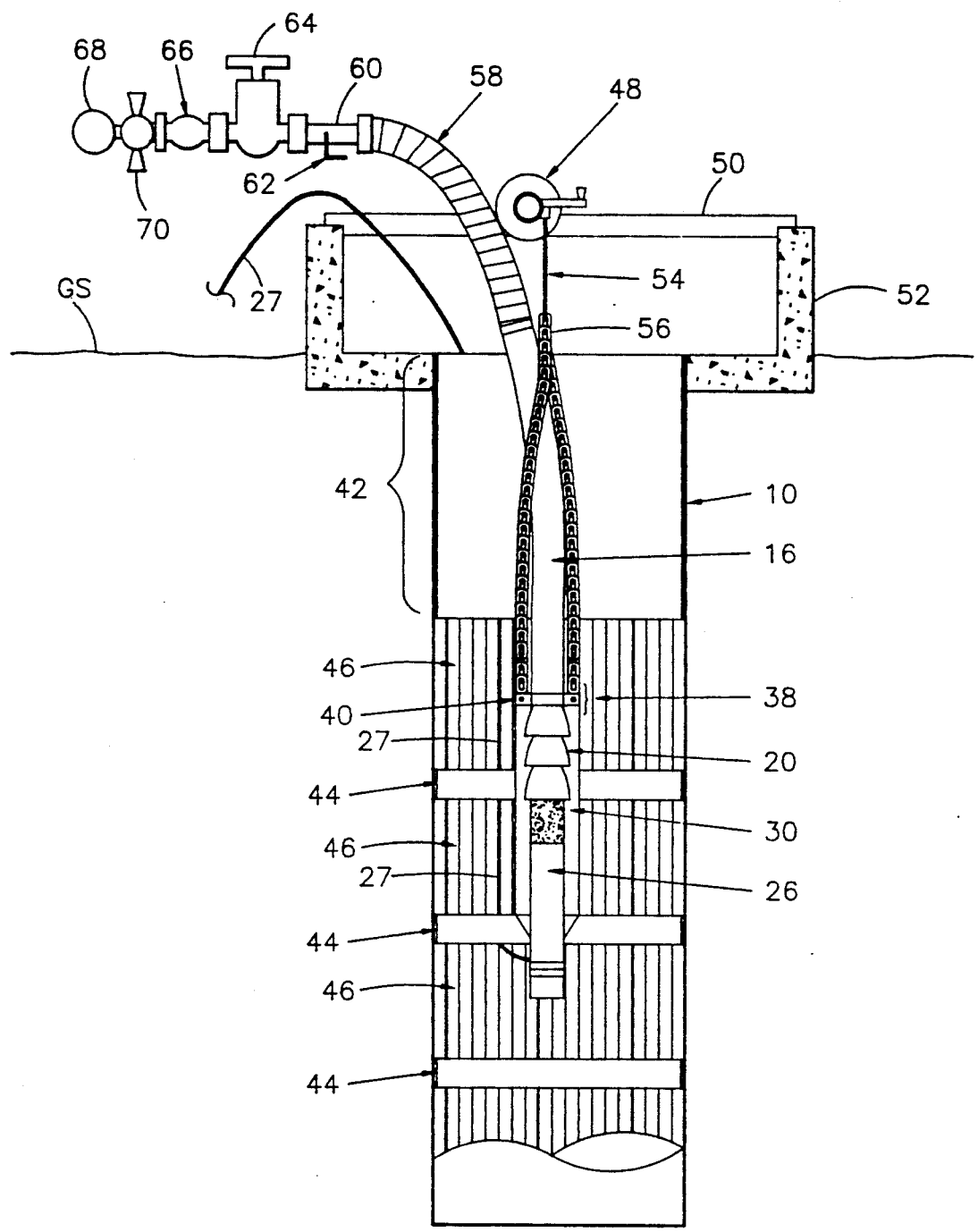
FIG. 3 shows a schematic front elevational view of a pump located in a well in accordance with the invention connected to a suspension device and to downstream fluid movement apparatus.

FIG. 3 shows pump system 14 suspended within a well casing 10 in accordance with aspects of the invention. As shown in FIG. 3, well casing 10 extends downwardly below ground surface GS and into the aquifer AQ and consists of solid casing 42 and solid rings 44. Mesh 46 extends between solid casing 42 and solid ring 44 and further between solid rings 44. Winch 48 is suspended above well casing 10 by support 50 and basin 52. Basin 52 is located partially below ground surface GS. Winch 48 is connected to support cable 54 and chain sling 56, which connects to pump system 14 at sleeve 30.

Flexible discharge hose 58 connects to outlet pipe 16 above ground surface, which connects to conduit 60. Conduit 60 has a sampling spigot 62. Flowmeter 64 connects to conduit 60 and also connects to check valve 66. Check valve 66 connects to flow control valve 70 which connects to a manifold pipe 68, which connects to water and contaminant separation equipment (not shown and is well known in the art).

FIGS. 4-8 show pump system 14 in five different positions relative to water located in a well and a layer of contaminant floating on the water. The contaminant layer is labeled "oil" for convenience and the water is labeled "water." The top of the contaminant layer is denoted by ▼ and the top of the water is denoted by ∇.

Turning now to the drawings generally, installation and operation of the system of the invention will now be described below. Once a spill or release of liquid contaminant has been identified, it is necessary to determine the area of downward and lateral progression and/or migration of the contaminant. Location of this progression is achieved through ordinary methods well known to those of ordinary skill in the art and is not discussed herein. After contaminant location has been determined, it is necessary to determine the proper location and number of wells necessary to remove the contaminant. This procedure is also well known.

It is important that each well be located at or dropped to depths capable of receiving liquid contaminant located on or above the water table and water from the underlying water table. Thus, well depth should be at least as deep as the normal location of the water table to maximize contaminant removal efficiency. This is necessary to ensure enough clearance at the bottom of the well for the lower portion of pump system 14. Well depth should preferably be below the top of the normal location of the water table to allow for vertical movement of the water table during pumping operations.

As shown in FIG. 3, a well casing 10 should be dropped below ground surface GS to a depth sufficient to reach into the underlying aquifer AQ. Many types of well casing may be used, although continuously perforated casing is preferred. Mesh 46 permits water and contaminants to flow inwardly to the annular space created within well casing 10. Mesh 46 also assists in preventing borehole collapse and entry of debris of various types which might clog pump system 14. Once a well casing 10 is dropped into the aquifer AQ, it is preferred to have a working area provided above solid casing 42 to facilitate ease of installation and operation of the system. This is preferably achieved by constructing a basin 52 and supplying a support member 50. This construction should preferably be provided for each well for ease of installation, maintenance and monitoring.

Once the proper number of wells have been identified and dropped into the aquifer AQ, it is necessary to prepare pump system 14 for lowering into well casing 10 for each well. This is performed by attaching support cable 54 and chain sling 56 to sleeve 30 approximate vibration brace 40. Cable support 54 is connected to winch 48, which is secured in a stationary position by support 50. Outlet pipe 16 is connected to flexible discharge hose 58, which connects to downstream fluid disposal and treatment apparatus. Flexible discharge hose 58 provides for ease of lowering pump system 14 into well casing 10.

Once pump system 14 is properly connected to the suspension and lowering means, pump system 14 should be slowly lowered into well casing 10, down to the layer of contaminant floating on the water within well casing 10 and downwardly into the water. Pump system 14 should be lowered sufficiently into the contaminant layer and water so that the upper opening of sleeve 30 lies below the layer contaminant and the upper surface of the water. This is illustrated in FIG. 8 of the drawings. It is preferred to lower pump system to a depth wherein the top of sleeve 30 is below the upper surface of the contaminant under pumping conditions. Then, flow control valve 70 should be opened and pump 20 actuated by supplying power to motor 26.

Pump 20 should be permitted to pump water and/or contaminant until the top of sleeve 30 becomes visible and extends to about the top of the contaminant layer. This procedure should be monitored on a recurring basis, such as every minute for a desired period of time, such as for one hour, for example. This process is shown in FIG. 5 of the drawings. Thus, pump system 14 is first lowered below the top of the water as shown in FIG. 8, and then the water table level is lowered by pumping until the top of sleeve 30 is at or above the top of the contaminant layer as shown in FIG. 5.

Then, valve 70 should be closed slightly to determine whether the top of the contaminant layer rises above or substantially above the top of sleeve 30. This test should proceed for a desired period of time, such as for five minutes, for example. If the contaminant layer rises above the top of sleeve 30, valve 70 should be opened slightly, but not as far as the initial opening, and the checking period reinitiated. This process should be repeated until the contaminant layer appears stabilized near the top of sleeve 30. This is illustrated in FIGS. 5 and 6. Of course, it should be understood that these initial checking steps are performed upon initial set up and are not further required during pumping operations since the system is essentially self-regulating.

Proper operation of pump system 14 is shown in both FIGS. 5 and 6 of the drawings since they achieve optimum contaminant recovery. For example, FIG. 5 shows the top of sleeve 30 extending one centimeter above the top of the oil layer. This permits the entire depth of the oil layer to enter sleeve 30 through the perforations together with a reduced portion of water. This results in excellent contaminant recovery and a small quantity of air in the discharged water/contaminant exiting into the manifold pipe 68. Maintaining pump system 14 in this position is permissible with a pump system 14 having perforations 38 in sleeve 30. This is the most preferred form of the invention. Perforations 38 can be uniform or non-uniform, as shown in FIGS. 4–8, and can extend downwardly along sleeve 30 to a point no deeper than the top of the pump. The top of contaminant should not extend downwardly on sleeve 38 to a point permitting greater than about 10% air in the discharge is highly undesirable since the pump tends to surge. However, the self-regulating nature of the pump 14 automatically prevents this occurrence.

FIG. 6 shows pump system 14 at a further preferred level with respect to the top of the contaminant and water in the well. This position may be used for a sleeve 30 having perforations 38 or no perforations 38. In FIG. 6, the opening of sleeve 30 is positioned directly at the top of the water table at the intersection point with contaminant floating on the water. The distance between the top of the water table and the top of the contaminant floating on the water table is 4 cm as shown in the drawing. This relative position has the same advantages as the position shown in FIG. 5 of the drawings, and may be altered slightly to any position between FIG. 6 and FIG. 5.

FIGS. 4, 7 and 8 show pump system 14 positioned in a position having reduced contaminant recovery efficiency. For example, FIG. 4 shows a distance of 10 cm between the top of the contaminant layer and the top of the sleeve. In the case where water level declines as shown in the drawings, the pump 20 does indeed pump contaminant and water, but at a reduced efficiency rate. The quantity of air in the total discharge at manifold pipe 68 is about 40% air, which is highly undesirable since it results in pump surging. Also, the quantity of contaminant recovered is reduced with respect to the maximum pumping ability of the system. The naturally-regulated flow rate of the pump 14 minimizes the tendency to draw down below the perforations 38.

FIG. 7 shows another undesirable relative positioning of pump system 14. In this position, the pump discharges a large quantity of water compared to the quantity of contaminant discharged. The distance between the top of the sleeve and the top of the contaminant floating on the water is 6 cm. An upward adjustment of the pump system 14 to the position shown in FIG. 5 of the drawings is advantageous to correct this situation.

FIG. 8 shows pump system 14 positioned relative to the water table and contaminant floating on the water at a highly disadvantageous position. The fluid level at the top of sleeve 30 is 10 cm below the top of the contaminant layer. This results in virtually no product recovery and no air discharge. Accordingly, it is advantageous in the invention to position the pump system 14 as shown in either FIGS. 5 or 6 of the drawings.

Prior to initiating operation of a second pump in a second well at a different location, the first pump should be permitted to operate for several hours to ensure that water/contaminant levels have stabilized. It should be noted that all pumps affect other pumps in the general vicinity and when one pump is turned off for whatever reason, such as for maintenance, for example, other pumps should be monitored for a brief time for potential readjustment of depth. The total number of pumps influences the potential readjustment that may be needed. Turning off one pump when many pumps are operating might require little or no readjustment. Conversely, turning off one pump when two or three pumps are operating would probably require some amount of readjustment.

It has been discovered that the pump system and pumping method of the invention efficiently remove contaminants from contaminated aquifers. The design of pump system 14 permits easy installation and maintenance. Utilization of a sleeve 30 having a multiplicity of perforations 38 permits removal of contaminants from aquifers in a still easier and efficient manner. The pump system and method of the invention avoid the prior art requirements of multiple pumps and/or troublesome and complicated sensor and monitoring equipment because water and contaminant levels are naturally controlled at the level of perforations 38 or the top of the sleeve 30 because pumping rate decreases a fluid levels decline.

The method is applicable to removing a wide variety of liquid contaminants capable of passing through pumps, such as gasoline, kerosene, aviation and other hydrocarbon fuels, benzene, methylethylketone, mineral spirits, acetone, alcohols, various pesticides, mixtures of the above and any other liquid compounds, especially toxic organic compounds.

Although this invention has been described in connection with specific forms thereof, it will be appreciated that a wide array of equivalents may be substituted for the specific elements shown and described herein, and that a wide array of equivalents may be substituted for the specific step described herein without departing from the spirit and scope of this invention as described in the appended claims.

For example, pump system 14 may contain component parts such as outlet pipe 16, check valve 18, pump 20, etc., made by various manufacturers and materials. In the case of outlet pipe 16 or pump 20, the material is preferably steel, but may be of any number of other types of materials such as plastics, for example. Similarly, flexible discharge hose 58 should preferably be made of a rubber fire hose-type material. However, other types of materials may be utilized, so long as they are flexible and resistant to hydrocarbons. Also, any number of sling materials may be used for sling 56. Such materials can include chain link, wire cable, rope and the like. Winch 48 can be hand operated or mechanically operated such as by electrical motor or gasoline engine, for example. Various materials for sleeve 30 may be utilized, but polyvinylchloride pipe is preferred.

What is claimed is:

1. Apparatus for removing liquid contaminant from a well to decontaminate a contaminated aquifer comprising:
   a pump capable of moving water and contaminant from below ground surface to a location above ground surface;
   a motor connected to drive the pump;
   means connected to power the motor;
   a water and contaminant inlet located between the pump and the motor to accept inward flow of water and contaminant to the pump;
   an outlet pipe connected to the pump and extending above ground surface; and
   a sleeve surrounding the inlet and connected between the inlet and the motor and having an opening to receive water and contaminant at one or more points along the outlet pipe, the sleeve being sized to slide in and out of the well and larger than the outlet pipe and creating an annular space to permit passage of water and contaminant from the opening to the inlet.

2. The apparatus defined in claim 1 further comprising a check valve positioned between the outlet pipe and the pump to prevent water and contaminant from flowing from the outlet pipe into the pump.

3. The apparatus defined in claim 1 further comprising a strainer located between the pump and the inlet capable of permitting passage of water and contaminant to the pump but not debris.

4. The apparatus defined in claim 1 further comprising suspension means connected to suspend the sleeve at a desired location in the well.

5. The apparatus defined in claim 4 wherein the suspension means is selected from the group consisting of chain, rope and cable.

6. The apparatus defined in claim 1 wherein the sleeve has a multiplicity of perforations located adjacent the opening.

7. The apparatus defined in claim 1 further comprising anti-vibration bracing positioned between the opening in the sleeve and the outlet pipe.

8. Apparatus for removing liquid contaminant from a well to decontaminate a contaminated aquifer comprising:
   a pump capable of moving water and contaminant from below ground surface to a location above ground surface and having a pump inlet connected to accept inward flow of water and contaminant to the pump, and a motor connected to drive the pump;
   means connected to supply power to the motor;
   an outlet pipe connected to the pump and extending above ground surface; and
   a sleeve surrounding the pump inlet and having an opening positioned to receive water and contaminant at one or more points along the outlet pipe, the sleeve being sized to slide in and out of the well and larger than the outlet pipe and creating an annular space to permit passage of water and contaminant to the inlet.

9. The apparatus defined in claim 8 further comprising a check valve positioned between the outlet pipe and the pump to prevent water and contaminant from flowing from the outlet pipe into the pump.

10. The apparatus defined in claim 8 further comprising a strainer located between the pump and the inlet capable of permitting passage of water and contaminant to the pump but not debris.

11. The apparatus defined in claim 8 further comprising suspension means connected to suspend the sleeve at a desired location in the well.

12. The apparatus defined in claim 11 wherein the suspension means is selected from the group consisting of chain, rope and cable.

13. The apparatus defined in claim 8 wherein the sleeve has a multiplicity of perforations located adjacent the opening.

14. The apparatus defined in claim 8 further comprising anti-vibration bracing positioned between the opening in the sleeve and the outlet pipe.

15. A method of removing liquid contaminant lying on a water table comprising the steps of:
   a) lowering a water and contaminant pump system into a well extending into the water table, the pump system including a pump capable of moving water and contaminant from below ground surface to a location above ground surface and having a pump inlet connected to accept inward flow of water and contaminant to the pump and a motor connected to drive the pump; means connected to supply power to the motor; an outlet pipe connected to the pump and extending above ground surface; and a sleeve surrounding the pump inlet and having an opening to receive water and contaminant at one or more points along the outlet pipe, the sleeve sized to slide in and out of the well and being larger than the outlet pipe and creating an annular space to permit passage of water and contaminant to the inlet, the pump system being lowered to a desired depth within the well wherein the opening in the sleeve is located below the top of water in the well;

b) actuating the pump to cause water to flow into the sleeve and through the inlet, the pump and the pipe to a location above ground surface;

c) drawing down the water table until the opening in the sleeve is at about the top of contaminant floating on water in the well and the depth to the contaminant stabilities at a substantially constant depth;

d) raising the sleeve to about the top of the water in the well if the opening in the sleeve remains substantially below the top of the water in the well; and e) pumping and removing water and contaminant from the well until the contaminant is substantially removed from the top of the water table.

16. The method defined in claim 15 further comprising:

i) reducing the rate of water removal for a desired period of time;

ii) observing the level of contaminant relative to the opening in the sleeve; and iii) increasing the rate of water removal for a desired period of time if the contaminant rises above the opening in the sleeve;

iv) repeating steps i) through iii) until the depth to the contaminant substantially stabilizes.

17. A method of removing liquid contaminant lying on a water table comprising the steps of:

a) lowering a water and contaminant pump system into a well extending into the water table, the pump system including a pump capable of moving water and contaminant from below ground surface to a location above ground surface and having a pump inlet connected to accept inward flow of water and contaminant to the pump and a motor connected to drive the pump; means connected to supply power to the motor; an outlet pipe connected to the pump and extending above ground surface; and a sleeve sized to slide in and out of the well and surrounding the pump inlet and having an opening positioned to receive water and contaminant along the outlet pipe, the sleeve having a multiplicity of perforations adjacent the opening and being sized to permit passage of water and contaminant from the opening to the inlet, the pump system being lowered to a desired depth within the well wherein the opening in the sleeve is located below the top of water in the well;

b) actuating the pump to cause water to flow into the sleeve and through the inlet, the pump and the pipe to a location above ground surface;

c) drawing down the water table until the opening in the sleeve is at about the top of contaminant floating on water in the well and the depth to the contaminant stabilizes at a substantially constant depth;

d) raising the sleeve to about the top of the water in the well if the opening in the sleeve remains substantially below the top of the water in the well or lowering the sleeve if the opening in the sleeve extends substantially above contaminant floating on the water in the well; and e) pumping and removing water and contaminant from the well until the contaminant is substantially removed from the top of the water table.

18. The method defined in claim 17 further comprising:

i) reducing the rate of water removal for a desired period of time;

ii) observing the level of contaminant relative to the opening in the sleeve; and iii) increasing the rate of water removal for a desired period of time if the contaminant rises above the opening in the sleeve;

iv) repeating steps i) through iii) until the depth to the contaminant substantially stabilizes.

19. The method defined in claim 17 wherein the top of the contaminant substantially stabilizes no more than about 5 centimeters below the opening in the sleeve.

20. The method defined in claim 17 wherein the top of the contaminant substantially stabilizes no more than about 2 centimeters above the perforations in the sleeve.

* * * * *

UNITED STATES PATENT AND TRADEMARK OFFICE
CERTIFICATE OF CORRECTION

PATENT NO. : 5,262,065
DATED : November 16, 1993
INVENTOR(S) : Kevin Hansen et al It is certified that error appears in the above-indentified patent and that said Letters Patent is hereby corrected as shown below:

On the title page, at [75] after "Kevin Hansen, Newark, Del."

insert --Raymond A. Scheinfeld, Philadelphia, Pa.
Thomas R. Marks, Elverson, Pa.--

Signed and Sealed this

Third Day of May, 1994

Attest:

BRUCE LEHMAN

Attesting Officer

Commissioner of Patents and Trademarks